US008505872B2

(12) United States Patent
Kawamura et al.

(10) Patent No.: US 8,505,872 B2
(45) Date of Patent: Aug. 13, 2013

(54) VALVE CONTROL APPARATUS AND VALVE APPARATUS

(75) Inventors: Satoshi Kawamura, Tokyo (JP); Shigenaga Yamasaki, Hyogo (JP); Sotsuo Miyoshi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 454 days.

(21) Appl. No.: 12/992,339

(22) PCT Filed: May 12, 2009

(86) PCT No.: PCT/JP2009/002068
§ 371 (c)(1),
(2), (4) Date: Nov. 12, 2010

(87) PCT Pub. No.: WO2010/013372
PCT Pub. Date: Feb. 4, 2010

(65) Prior Publication Data
US 2011/0062358 A1    Mar. 17, 2011

(30) Foreign Application Priority Data
Aug. 1, 2008    (JP) .................................. 2008-199555

(51) Int. Cl.
*F16K 31/04*    (2006.01)

(52) U.S. Cl.
USPC ............ 251/129.13; 251/129.04; 251/129.11; 137/487.5; 123/568.19; 123/568.21; 123/568.23; 123/568.26

(58) Field of Classification Search
USPC ............ 251/129.04, 129.11, 129.12, 129.13; 137/487.5; 123/568.21, 568.19, 568.23, 123/568.26
See application file for complete search history.

(56) References Cited

U.S. PATENT DOCUMENTS

| | | | | |
|---|---|---|---|---|
| 4,840,350 | A * | 6/1989 | Cook ........................ | 251/129.11 |
| 6,012,437 | A * | 1/2000 | Radhamohan et al. .. | 123/568.23 |
| 6,039,034 | A * | 3/2000 | Field et al. ................ | 123/568.23 |
| 6,056,000 | A * | 5/2000 | Santacatterina et al. .......... | 137/1 |
| 6,412,753 | B2 * | 7/2002 | Fujita et al. .............. | 251/129.11 |
| 6,675,783 | B1 * | 1/2004 | Kawamura et al. ...... | 123/568.23 |
| 6,688,294 | B1 * | 2/2004 | Kawamura et al. ...... | 123/568.24 |
| 6,698,408 | B2 * | 3/2004 | McConnell .............. | 123/568.21 |
| 6,729,314 | B2 * | 5/2004 | Radhamohan et al. .. | 123/568.21 |
| 7,284,370 | B2 * | 10/2007 | Tatsukawa ........................ | 60/324 |
| 7,637,245 | B2 * | 12/2009 | Katsuno et al. ............... | 123/396 |
| 2002/0134956 | A1 * | 9/2002 | Smith et al. .............. | 251/129.04 |

(Continued)

FOREIGN PATENT DOCUMENTS

| | | |
|---|---|---|
| JP | 2-271011 A | 11/1990 |
| JP | 8-108772 A | 4/1996 |
| JP | 11-159405 A | 6/1999 |
| JP | 2005-201280 A | 7/2005 |

*Primary Examiner* — John K Fristoe, Jr.
*Assistant Examiner* — Minh Le
(74) *Attorney, Agent, or Firm* — Birch, Stewart, Kolasch & Birch, LLP

(57) ABSTRACT

A valve control apparatus sets a certain soft landing start target position to a drive control unit for carrying out driving of a DC motor 2 as a target open position in response to a fully close command, and sets the target open position which the valve control apparatus acquires by gradually decreasing the soft landing start target position to the above-mentioned drive control unit at a time when the difference between an actual open position and the soft landing start target position becomes equal to a first threshold.

11 Claims, 5 Drawing Sheets

(56) References Cited

U.S. PATENT DOCUMENTS

| | | | |
|---|---|---|---|
| 2005/0001188 A1* | 1/2005 | Everingham et al. | 251/129.11 |
| 2005/0092308 A1* | 5/2005 | Tsokonas | 123/568.23 |
| 2005/0274367 A1* | 12/2005 | Malone et al. | 123/568.18 |
| 2005/0274920 A1* | 12/2005 | Busato et al. | 251/129.11 |

* cited by examiner

VALVE CONTROL APPARATUS AND VALVE APPARATUS

The application claims the benefit of priority to JP Patent Application No. 2008-199555, filed on Aug. 1, 2008.

FIELD OF THE INVENTION

The present invention relates to a valve control apparatus that controls the opening of a valve, such as an EGR (Exhaust Gas Recirculation) valve used for, for example, vehicles, and a valve apparatus equipped with this valve control apparatus.

BACKGROUND OF THE INVENTION

In the engine of a vehicle, an EGR valve for opening and closing an exhaust gas recirculation passage is disposed. This EGR valve consists of a valve part and a motor which is an actuator for the valve part. Typically, a valve shaft and the motor shaft of the motor are disposed separately in the EGR valve. An operation of opening the valve is performed by pressing the motor shaft against the valve shaft and moving a valve element disposed at an end of the valve shaft from a valve seat in an opening direction. Furthermore, an operation of closing the valve is performed by propagating the pushing force of a spring to the valve element via the valve shaft.

As an operation at the time of initialization of the EGR valve, the position of a motor stopper where the motor shaft is brought into contact with the stopper by retracting the motor shaft and hence the rotor becomes unable to rotate is detected first. Then, the rotor is made to rotate from the motor stopper position in the valve opening direction by extruding the motor shaft, and the position where the motor shaft comes into contact with the valve shaft is detected as a valve opening start position.

Furthermore, in the above-mentioned EGR valve, when soot (deposit) or the like included in the engine exhaust gas enters and adheres to the gap between the valve shaft and the bearing, the valve shaft cannot return to the valve closed position because of the pushing force of the spring, and may be fixed to the valve open position. This malfunction can be cleared by completely coupling the valve shaft and the motor shaft to each other in such a way that the valve shaft and the motor shaft are integrally formed with each other along an axial direction, and carrying out an opening or closing operation of forcedly opening or closing the valve shaft by using the driving force of the motor.

A conventional valve control apparatus for controlling the valve opening of a valve apparatus having a structure of not coupling a motor and a valve directly to each other is disclosed by, for example, patent reference 1. This valve control apparatus estimates the motor speed or the motor position by using the fact that a value which is obtained by integrating a motor control signal (a command duty ratio or a motor current) once is proportional to the motor speed, and the integral of this motor speed provides a value proportional to the motor position so as to correct a command opening or the motor control signal according to the estimated motor speed or motor position. By doing in this way, the conventional valve control apparatus can carry out the motor control according to the motor speed or the motor position, and can improve the motor control performance without increasing the number of sensors.

RELATED ART DOCUMENT

Patent Reference

Patent reference 1: JP, 8-108772, A

SUMMARY OF THE INVENTION

In an EGR valve in which a motor shaft and a valve shaft are integrally formed with each other along an axial direction, a valve opening start position is detected by retracting the valve shaft toward the motor and pressing a valve element against a valve seat (a valve housing) during initialization for learning the valve opening start position, unlike in the case of the above-mentioned typical structure in which a valve shaft and the motor shaft of a motor are disposed separately.

Therefore, when the valve shaft is rapidly retracted in response to a fully close command, the valve element is strongly pressed against the valve housing when seated onto the valve seat, and the valve may become damaged due to shock occurring at that time. Furthermore, when a fully closed state (i.e., a state in which the valve element is pressed against the valve housing) lasts for a long time period, the drive duty ratio of the motor becomes high and there is a possibility that generation of heat and a failure occur in the motor.

In addition, in the EGR valve in which the motor shaft and the valve shaft are integrally formed with each other along an axial direction, the force of retracting the rotor Assy toward the housing at the time of closing the valve is large, unlike in the case of the structure in which a valve shaft and the motor shaft of a motor are disposed separately. Therefore, there is a possibility that a waved washer supporting the bearing of the motor gets fatigued and damaged when a large load is imposed upon the waved washer and the opening or closing operation of opening or closing the valve is repeated.

The present invention is made in order to solve the above-mentioned problems, and it is therefore an object of the present invention to provide a valve control apparatus that can reduce shock occurring in a valve apparatus in which a motor shaft and a valve shaft are integrally formed with each other along an axial direction at the time when a valve element is seated onto a valve seat, and that can carry out drive controlling in such a way that the drive duty ratio of the motor becomes equal to or smaller than a predetermined load.

In accordance with the present invention, there is provided a valve control apparatus for carrying out opening and closing control of a valve apparatus provided with an actuator and an integrally constructed shaft in which a driving shaft linearly moved by this actuator and a valve shaft are integrally formed with each other along an axial direction, for opening and closing a valve element with respect to a valve seat disposed in a valve housing according to a linear movement of the integrally constructed shaft in axial directions which is caused by a driving force of the above-mentioned actuator, the above-mentioned valve control apparatus including: a drive control unit for carrying out feedback control of an open position of the above-mentioned valve apparatus in such a way that an actual open position determined from the linear movement of the above-mentioned integrally constructed shaft of the above-mentioned valve apparatus gets close to a target open position; and a fully closed state determining unit for setting a certain soft landing start target position to the above-mentioned drive control unit as the target open position in response to a fully close command, and for setting the target open position which the fully closed state determining unit acquires by gradually decreasing the above-mentioned soft landing start target position to the above-mentioned drive control unit at a time when a difference between the above-mentioned actual open position and the above-mentioned soft landing start target position becomes equal to a first threshold, in which the soft landing start target position is a position which is apart from an immediately preceding fully closed position learned value by at least a detection error range of the open position at a time of learning of a fully closed position.

The valve control apparatus in accordance with the present invention sets a certain soft landing start target position to the drive control unit of the valve apparatus as the target open position in response to the fully close command, and sets the target open position which the valve control apparatus acquires by gradually decreasing the soft landing start target position to the drive control unit at the time when the difference between the actual open position determined from the linear movement of the integrally constructed shaft and the soft landing start target position becomes equal to the first threshold. By doing in this way, the valve control apparatus provides an advantage of being able to reduce shock when the valve element is seated onto the valve seat in the valve apparatus having the integrally constructed shaft in which the driving shaft and the valve shaft are integrally formed with each other along the axial direction.

EMBODIMENTS OF THE INVENTION

Hereafter, in order to explain this invention in greater detail, the preferred embodiments of the present invention will be described with reference to the accompanying drawings.

Embodiment 1

Figure 1:
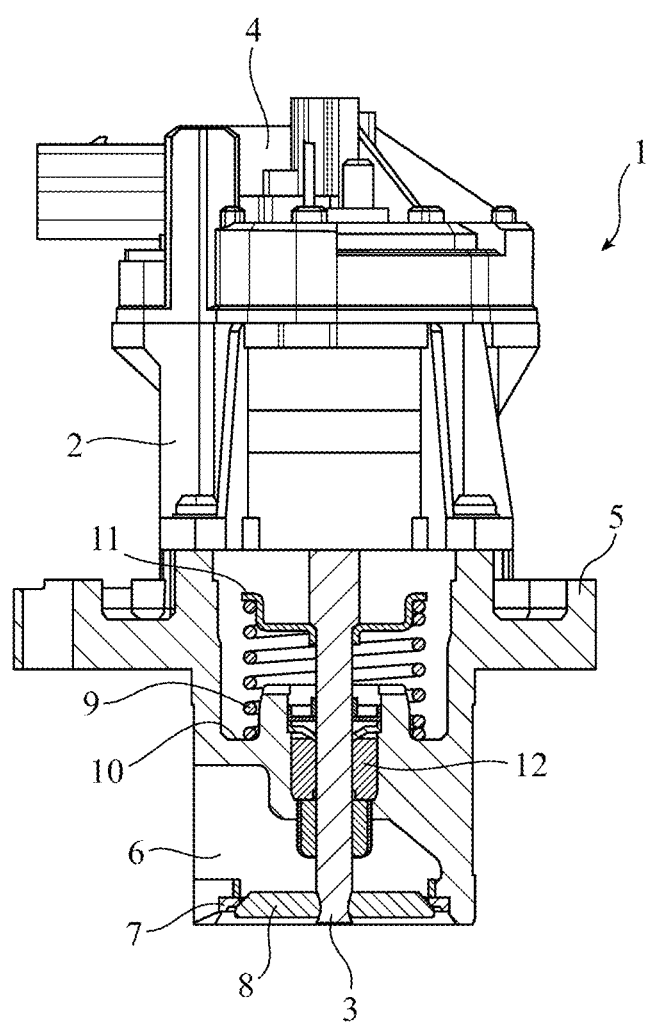
FIG. 1 is a cross-sectional view of an EGR valve in accordance with Embodiment 1 of the present invention.

FIG. 1 is a cross-sectional view of an EGR valve (a valve apparatus) 1 in accordance with Embodiment 1 of the present invention, and shows the EGR valve which is constructed in such a way that a valve shaft and a motor shaft are completely coupled to each other and are integrally formed with each other along an axial direction. In FIG. 1, a DC motor (an actuator) 2 which is an actuator of the valve is disposed in a valve housing 5 of the EGR valve 1. Furthermore, the EGR valve has a shaft (an integrally formed shaft) 3 in which the motor shaft of the DC motor 2 and the valve shaft are integrally formed with each other along the axial direction. An exhaust gas passage through which an exhaust gas is passed is formed in the valve housing 5, and an outlet passage 6 is formed in this exhaust gas passage. A valve seat 7 is formed between the exhaust gas passage in the valve housing 5, and the outlet passage 6.

A valve element 8 is disposed in such a way as to be seated onto the valve seat 7 by retracting the shaft 3 toward the DC motor 2, and go away from the valve seat 7 by extruding the shaft 3 toward the valve housing 5. The valve element 8 is attached to the shaft 3 through, for example, press fitting of the shaft into the valve element. Furthermore, the shaft 3 is supported by a bearing 12 attached to the valve housing 5 above the outlet passage 6 in such a way as to be slidable in axial directions. A spring 9 is disposed between the valve housing 5 and the shaft 3. A lower end of the spring 9 is supported by a spring bracket 10 of the valve housing 5. On the other hand, an upper end of the spring 9 is brought into contact with a spring holder 11.

Furthermore, a position sensor (an open position sensor and a drive control unit) 4 is disposed in an upper portion of the DC motor 2. The position sensor 4 is an EGR opening sensor for detecting an actual open position (an EGR opening (%)), and outputs a voltage depending upon the movement position of the shaft 3 of the DC motor 2 to the valve control apparatus, which will be mentioned below with reference to FIG. 2, as an EGR opening detection signal showing the position of the valve element 8 of the EGR valve 1. Because the EGR valve 1 in accordance with the present invention is constructed in such a way as to have the shaft 3 which is the motor shaft and the valve shaft formed integrally, as mentioned above, the EGR valve 1 can precisely grasp the open or closed state of the valve element 8 by detecting the actual open position of the shaft 3 using the position sensor 4.

Figure 2:
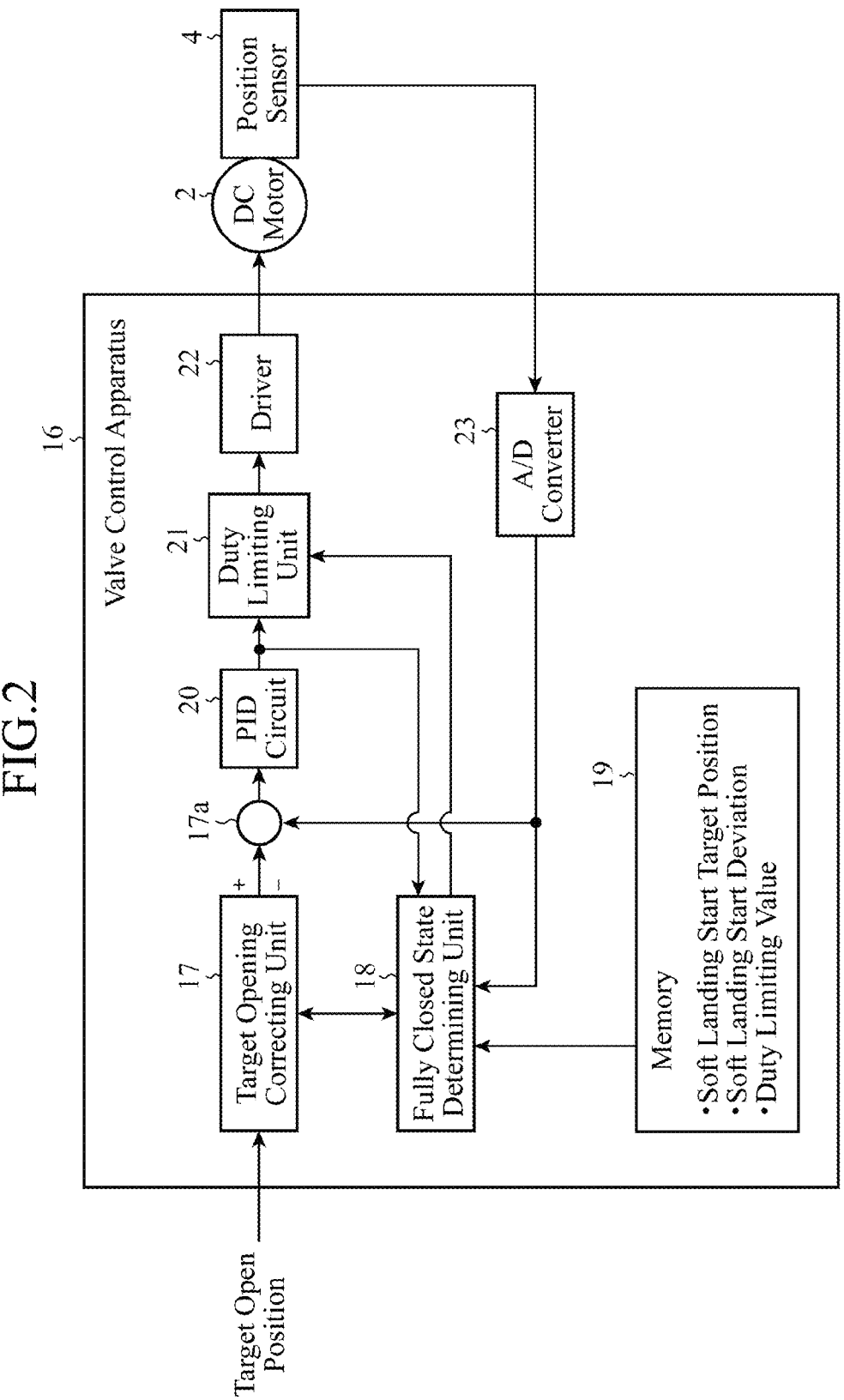
FIG. 2 is a view showing the structure of a valve control apparatus in accordance with Embodiment 1.

FIG. 2 is a view showing the structure of the valve control apparatus 16 in accordance with Embodiment 1, and also shows a connection relationship with the DC motor 2 and the position sensor 4 of the EGR valve 1. As shown in FIG. 2, the valve control apparatus 16 is provided with a target opening correcting unit (the drive control unit) 17, a subtracter (the drive control unit) 17a, a fully closed state determining unit 18, a memory 19, a PID circuit 20, a duty limiting unit (a duty limiting unit) 21, a driver (the drive control unit) 22, and an A/D converter (the drive control unit) 23. The drive control unit for controlling the driving of the DC motor 2 (feedback control of the open position of the EGR valve 1) is comprised of the target opening correcting unit 17, the subtracter 17a, the PID circuit 20, the driver 22, and the A/D converter 23. The target opening correcting unit 17 receives input of a target open position, and corrects the target open position in such a way that the target open position matches an open position inputted thereto from the fully closed state determining unit 18.

When receiving a fully close command control signal based on a request for learning of the valve opening start position (an initialization start command), the fully closed state determining unit 18 outputs a soft landing start target position read from the memory 19 to the target opening correcting unit 17, and also reads the output of the position sensor 4 via the A/D converter 23. Then, when the difference between the actual open position detected by the position sensor 4 and the soft landing start target position has become equal to or smaller than a soft landing start deviation, and a fixed time interval has elapsed, the fully closed state determining unit 18 gradually decreases the open position which the fully closed state determining unit sets to the target opening correcting unit 17 by a predetermined decrement. Thus, when the valve is fully closed, the valve element 8 is soft-landed onto the valve seat 7 without the shaft 3 being rapidly retracted.

Furthermore, when a state in which the difference between the current actual open position detected by the position sensor 4 and the immediately preceding actual open position (the actual open position preceding the current actual open position by one sample) is equal to or smaller than a predetermined value, and the drive duty ratio calculated by the PID circuit 20 is equal to or smaller than a predetermined value lasts for a predetermined time interval, the fully closed state determining unit 18 calculates the average of the detected signal voltage of the position sensor 4 within a fixed time interval, and sets the position shown by this average as a new learned value of the valve opening start position.

In addition, in a state in which the EGR valve 1 is fully closed, when a state in which there is no request for learning of the valve opening start position, the target open position corrected by the target opening correcting unit 17 is lower than the current actual open position detected by the position sensor 4, the above-mentioned actual open position falls within a range of a predetermined value from the fully closed position (the valve opening start position), and the drive duty ratio inputted from PID circuit 20 is smaller than a duty limiting value lasts for a predetermined time interval, the fully closed state determining unit 18 transmits a current conduction block command to the duty limiting unit 21.

The soft landing start target position, the soft landing start deviation, and the duty ratio limiting value are stored in the memory 19. The soft landing start target position is the target open position at which the valve control apparatus starts a soft landing operation of soft-landing the valve element 8 onto the valve seat 7 so as to make the valve enter the fully closed state. The soft landing start deviation is the difference between the target open position and the actual open position during the above-mentioned soft landing operation. The duty limiting value is an upper limit of the drive duty ratio which is used when determining whether or not to block current conduction to the DC motor 2.

The PID circuit 20 calculates a PI control amount according to the difference between the target open position and the actual open position to calculate the drive duty ratio on the basis of the PI control amount, and provides, as a PWM control signal, this drive duty ratio to the driver 22 via the duty limiting unit 21. The driver 22 turns on and off the voltage which the deriver provides to the DC motor 2 according to the PWM control signal at predetermined intervals so as to control the voltage which the deriver provides to the DC motor 2 according to a PWM signal dependent upon the ratio of an ON time to an OFF time during each of the predetermined intervals (the drive duty ratio: the PWM control signal).

The duty limiting unit 21 outputs the PWM control signal showing the drive duty ratio, which is inputted thereto from the PID circuit 20, to the driver 22, and, when receiving the current conduction block command from the fully closed state determining unit 18, stops the output of the PWM control signal to the driver 22 so as to block the current conduction to the DC motor 2. The A/D converter 23 converts the detection signal fed back thereto from the position sensor 4 into a digital signal, and the subtracter 17a receives input of the detection signal showing the actual open position from the position sensor 4 via the A/D converter 23, and also receives input of a digital signal showing the target open position from the target opening correcting unit 17. The subtracter 17a then calculates the difference between the detection signal and the digital signal, and outputs the difference to the PID circuit 20 as the difference between the target open position and the actual open position.

Next, the operation of the valve control apparatus will be explained.

(1) Learning of the Valve Opening Start Position (Initialization)

Figure 3:
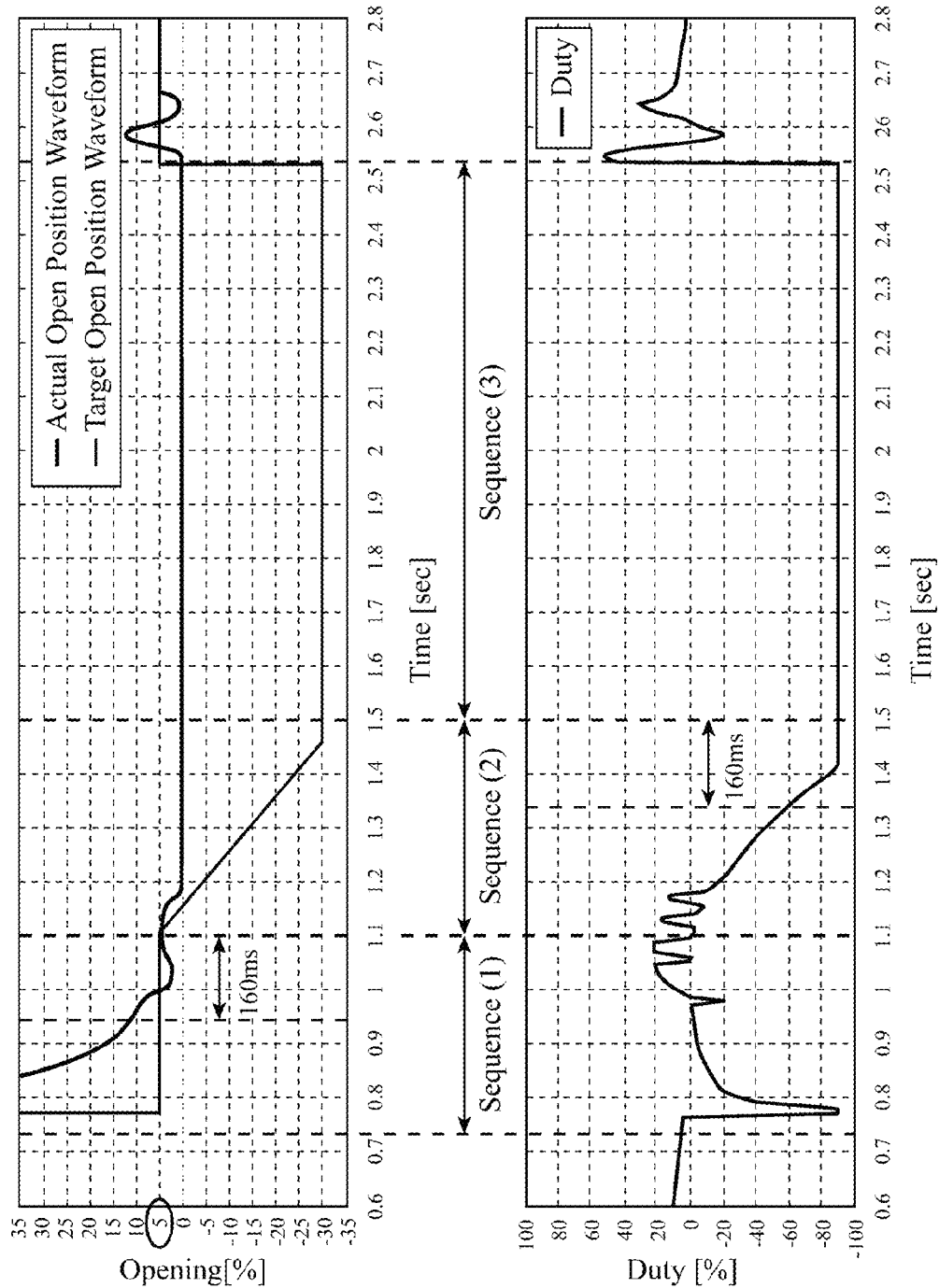
FIG. 3 is a view for explaining learning of a valve opening start position which is carried out by the valve control apparatus shown in FIG. 2.

FIG. 3 is a view for explaining the learning of the valve opening start position which is performed by the valve control apparatus 16 shown in FIG. 2, and a graph in the upper row shows a relationship between the target open position and the actual open position at the time of the learning of the valve opening start position and a graph in the lower row shows a change in the drive duty ratio at the time of driving the DC motor according to the relationship shown in the upper row. The opening (%) in the vertical axis of the graph in the upper row shows the open position (EGR opening (%)), and the target open position (a target opening waveform) is the open position which has been corrected by the target opening correcting unit 17 in such a way as to match the open position inputted from the fully closed state determining unit 18 and the actual open position (an actual opening waveform) is the actual open position detected by the position sensor 4.

Furthermore, the position at the opening of 0(%) shows the valve closed position of the EGR valve 1 (the immediately preceding learned position), and the positive range of the opening shows an open position in the open state of the EGR valve 1 and the negative range of the opening shows an open position (the position of the shaft 3) after the EGR valve 1 enters a valve closed state. In addition, the duty (%) in the graph in the lower row of FIG. 3 is the drive duty ratio which is calculated by the PID circuit 20. The positive range of the duty shows a drive duty ratio in the open state of the EGR valve 1, and the negative range of the duty shows a drive duty ratio after the EGR valve 1 enters the valve closed state.

The valve control apparatus 16 in accordance with Embodiment 1 learns the valve opening start position (i.e., the fully closed position) according to three sequences (1) to (3) as shown in FIG. 3.

(A) Sequence (1)

First, when receiving a fully close command control signal based on a request for learning of the valve opening start position (i.e., based on an initialization start command), the fully closed state determining unit 18 outputs the soft landing start target position read from the memory 19 to the target opening correcting unit 17. The target opening correcting unit 17 corrects the target open position in such a way that the target open position matches the soft landing start target position inputted thereto from the fully closed state determining unit 18. As a result, the target open position is set as the fixed soft landing start target position.

A displacement occurs in the valve opening start position every time when the learning of the valve opening start position is carried out, and the same position is not necessarily set as the valve opening start position. Therefore, when the immediately preceding learned position is lower than the actual valve closed position, there is a high possibility that the opening or closing operation is controlled on the basis of this position, and the valve element 8 is rapidly seated onto the valve seat 7. Therefore, by taking errors occurring in the learned position into consideration, a position which is apart from the immediately preceding learned value by at least an open position detection error range at the time of the learning of the valve opening start position (the fully closed position) is set as the soft landing start target position.

The errors in the learned position occurs under the influence of clogging caused by a deposit (a foreign object), a zero point displacement caused by secular changes, thermal expansion of the valve itself, a valve intrinsic error, a temperature drift of the output voltage of the position sensor 4, and so on. The temperature drift of the output voltage of the position sensor 4 has the greatest influence among these factors, and causes a maximum difference of about 5(%) between the actual valve closed position and the learned position. Therefore, a position which is apart from the immediately preceding learned value by at least the above-mentioned expected error resulting from the temperature drift is set as the soft landing start target position. In the example shown in FIG. 3, a value (the opening of 5(%) enclosed by a circle in FIG. 3) which is obtained by adding 5(%) of error which is expected as the error resulting from the temperature drift of the output voltage of the position sensor 4 to the immediately preceding learned valve closed position is used.

After the target open position is thus set as the soft landing start target position, the valve control apparatus 16 controls the valve closing operation of closing the EGR valve 1 while aiming at the soft landing start target position by feeding the detection signal from the position sensor 4 back to the EGR valve 1. At this time, the fully closed state determining unit 18 reads the output of the position sensor 4 via the A/D converter 23, and also reads the soft landing start deviation from the memory 19 so as to determine whether or not the difference between the actual open position detected by the position sensor 4 and the soft landing start target position is equal to or smaller than the soft landing start deviation. When the difference between the actual open position and the soft landing start target position exceeds the soft landing start deviation, the fully closed state determining unit makes the valve control apparatus continue the valve closing operation of closing the EGR valve 1 aiming at the soft landing start target position.

As the soft landing start deviation (a first threshold), a value equal to or larger than the error between the actual open position and the learned position which is caused by the above-mentioned temperature drift of the output voltage of the position sensor 4, and so on is set. For example, when the difference between the actual valve closed position and the learned position reaches about 5% at the maximum due to the temperature drift of the output voltage of the position sensor 4, the soft landing start deviation is set to a value equal to or larger than the above-mentioned expected error resulting from the temperature drift. In the example shown in FIG. 3, a value (the opening of 10(%)) which is obtained by adding 5(%) of error which is expected as the error resulting from the temperature drift of the output voltage of the position sensor 4 to the soft landing start target position (the opening of 5(%)) is used.

When the difference between the actual open position and the soft landing start target position becomes equal to or smaller than the soft landing start deviation (in FIG. 3, at the time when the actual open position is less than the opening of 10(%)), the fully closed state determining unit 18 measures a lapse of a predetermined wait time interval by using a not-shown timer. This wait time interval is provided in order to sufficiently bring the actual open position close to the immediately preceding learned position (the opening of 0(%)), and can be set arbitrarily. In the example of FIG. 3, the wait time interval is set to 160 (ms). When the above-mentioned wait time interval has elapsed, the fully closed state determining unit 18 makes a transition to the sequence (2). Instead of providing this wait time interval, when the difference between the actual open position and the soft landing start target position exceeds the soft landing start deviation, the fully closed state determining unit can make a transition to the sequence (2) to start the soft landing operation.

(B) Sequence (2)

When the above-mentioned wait time interval has elapsed, the fully closed state determining unit 18 starts the soft landing operation, and then gradually decreases the open position which the fully closed state determining unit sets to the target opening correcting unit 17 by a predetermined decrement until the open position becomes equal to a predetermined target open position. The above-mentioned predetermined target open position is determined in consideration of the factors of errors occurring in the above-mentioned learning of the valve opening start position, and the opening of −30(%) is used as the predetermined target open position in the example of FIG. 3. Furthermore, the fully closed state determining unit decreases the open position by the predetermined decrement of 100(%) per 1 second from the soft landing start target position to the above-mentioned predetermined target open position (the opening of −30(%)). By doing in this way, when performing the valve opening start position learning, the fully closed state determining unit can make the EGR valve 1 close slowly after the time when the EGR valve 1 is partially closed up to a small opening.

During the above-mentioned soft landing operation, the fully closed state determining unit 18 successively stores the actual open position detected by the position sensor 4 in the memory 19, and determines whether or not a state in which the difference between the current actual open position detected by the position sensor 4 and the immediately preceding actual open position (the actual open position preceding the current actual open position by one sample) is equal to or smaller than a predetermined value, and the drive duty ratio calculated by the PID circuit 20 is equal to or smaller than a predetermined value lasts for a predetermined wait time interval. When the actual open position reaches the actual fully closed position, the difference between the current actual open position and the immediately preceding actual open position becomes small. Therefore, the predetermined value set for the difference between the current actual open position and the immediately preceding actual open position is determined in consideration of the detection errors occurring in the actual open position due to the temperature drift of the output voltage of the position sensor 4, and so on. In the example of FIG. 3, 5(%) which is expected as the error resulting from the temperature drift of the output voltage of the position sensor 4 is used as the predetermined value.

Furthermore, because the valve control apparatus 16 carries out the feedback control of the DC motor 2 even if the actual open position reaches the actual fully closed position, the drive duty ratio rises. Therefore, an upper limit of the drive duty ratio which can permit generation of heat in the DC motor 2 which is caused by the rise of the drive duty ratio is set as the above-mentioned predetermined value set for the drive duty ratio, the upper limit being determined from, for example, the specifications of the DC motor 2 or experiments performed on the DC motor 2. Because this predetermined value is a drive duty ratio in the valve closed state, the predetermined value is negative and is set to a drive duty ratio of −60(%) in the example of the lower graph of FIG. 3. The fully closed state determining unit 18 monitors whether the drive duty ratio has become equal to or smaller than −60(%), i.e., whether or not the drive duty ratio has been largely inclined toward the negative ratio region.

The above-mentioned predetermined wait time interval is provided in order to sufficiently bring the actual open position close to the actual fully closed position, and can be set arbitrarily. In the example of FIG. 3, the wait time interval is set to 160 (ms). When the above-mentioned wait time interval has elapsed, the fully closed state determining unit 18 makes a transition to the sequence (3).

(C) Sequence (3)

After the above-mentioned wait time interval has elapsed, the fully closed state determining unit 18 calculates the average of the voltage of the detection signal of the position sensor 4 which has been measured for a fixed time interval, and then sets the position shown by this average as a new learned value of the valve opening start position. For example, the fully closed state determining unit sets the position shown by the average of the voltage of the detection signal of the position sensor 4 which has been measured for 1 second as the new valve opening start position.

(2) A Drive Duty Ratio Limitation Process in the Fully Closed State

Because the valve control apparatus 16 in accordance with present Embodiment 1 carries out the feedback control of the DC motor 2 even if the actual open position reaches the actual fully closed position, the drive duty ratio rises. Therefore, the valve control apparatus limits the drive duty ratio in the fully closed state by blocking the current conduction to the DC motor 2.

Figure 4:
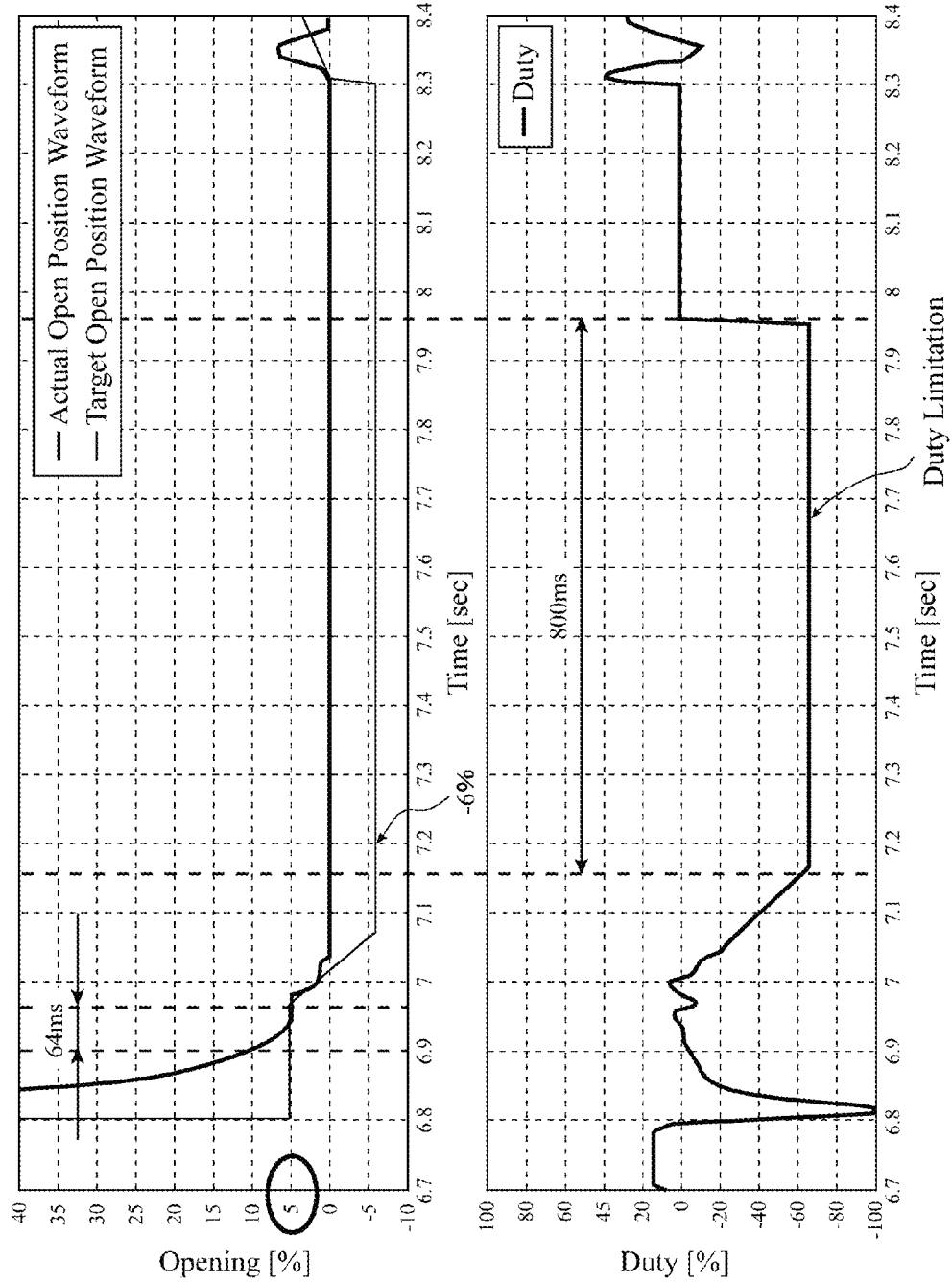
FIG. 4 is a view for explaining a drive duty ratio limitation process in a fully closed state which is carried out by the valve control apparatus shown in FIG. 2.

FIG. 4 is a view for explaining the drive duty ratio limitation process in the fully closed state which is carried out by the valve control apparatus 16 shown in FIG. 2, and a graph in the upper row shows a relationship between the target open position and the actual open position at the time of the learning of the valve opening start position and a graph in the upper row shows a change in the drive duty ratio at the time of driving the DC motor according to the graph in the upper row. Conditions under which the results of FIG. 4 are acquired are the same as those of FIG. 3.

Although steps which are performed until the valve is closed are fundamentally the same as those performed in the above-mentioned learning of the valve opening start position, the wait time interval at the time of starting the soft landing operation is shorter than that in the case of the learning of the valve opening start position and the target open position which is obtained by decreasing the soft landing start target position is larger than that in the case of the learning of the valve opening start position, as shown in FIG. 4 (the valve control apparatus does not move the shaft 3 to a further negative side (i.e., a further valve closed side) as compared with the case of the learning of the valve opening start position). This is because the fully closed position is determined through the learning of the valve opening start position, and the valve control apparatus can therefore retract the shaft 3 by a short distance from the fully closed position.

In FIG. 4, the wait time interval at the time of starting the soft landing operation is set to 64 (ms), and the target open position which is obtained by decreasing the soft landing start target position is set to −6(%). Instead of providing this wait time interval, when the difference between the actual open position and the soft landing start target position exceeds the soft landing start deviation, the fully closed state determining unit can start the soft landing operation.

When the following condition (e) is satisfied while the target open position is kept at −6(%), the fully closed state determining unit 18 sends a conduction block command to the duty limiting unit 21 so as to block the current conduction to the DC motor 2.

(a) There is no request for learning of the valve opening start position.

(b) The target open position is lower than the current actual open position.

(c) The actual open position falls within a range of a predetermined value from the fully closed position (the valve opening start position). In the example of FIG. 4, 5(%) which is expected as the error caused by the temperature drift of the output voltage of the position sensor 4 is set as the predetermined value.

(d) The drive duty ratio is smaller than the duty limiting value. The duty limiting value shown in FIG. 4 is a drive duty ratio of −60(%) (a second threshold), like in the case of FIG. 3. As this duty limiting value, an upper limit of the drive duty ratio which can permit generation of heat in the DC motor 2 which is caused by the rise of the drive duty ratio is set, the upper limit being determined from, for example, the specifications of the DC motor 2 or experiments performed on the DC motor 2.

(e) The above-mentioned state (a), . . . , or (d) lasts for a predetermined time interval (a first wait time interval). This predetermined time interval is the one during which the EGR valve 1 gets closed sufficiently, i.e., the time required to slightly press the valve element 8 against the valve seat 7 from the fully closed position to such an extent that there is no leakage, and is also the one during which the DC motor 2 does not become damaged due to generation of heat. In the example of FIG. 4, the predetermined time interval is set to 800 (ms).

When the drive duty ratio of the DC motor 2 rises through the feedback control of the DC motor 2 in the fully closed state and heat is generated in the DC motor, the DC motor 2 may undergo melt damage. From the above reasons, it is therefore necessary to set a time interval during which the DC motor 2 does not become damaged due to generation of heat as the above-mentioned predetermined time interval for the conduction block determination in the condition (e). For example, a thermistor is attached to the DC motor 2, and a time interval longer than the time required for the EGR valve 1 to get closed sufficiently and shorter than the time which has elapsed by the time the temperature of the DC motor 2 measured with the above-mentioned thermistor exceeds a certain value (for example, the temperature at which a melt damage occurs in the DC motor) is set as the above-mentioned predetermined time interval.

As an alternative, in a case in which no thermistor is attached to the DC motor 2, a temperature prediction model for predicting the temperature of the DC motor 2 can be created in advance on the basis of experiments, and a value shorter than the time which has elapsed by the time the temperature of the DC motor 2 predicted from the above-mentioned temperature prediction model exceeds the above-mentioned certain value can be set as the above-mentioned predetermined time interval.

Because the valve control apparatus needs to close the EGR valve 1 certainly and also needs to learn the closed position of the EGR valve at the time of the learning of the valve opening start position, the valve control apparatus does not carry out a blockage of the current conduction to the DC motor 2. Fundamentally, because the valve control apparatus performs the learning of the valve opening start position only once when starting the engine of the vehicle, and the number of times that the valve control apparatus performs the learning of the valve opening start position is thus small, the valve control apparatus does not have to carry out a blockage of the current conduction to the DC motor 2.

Figure 5:
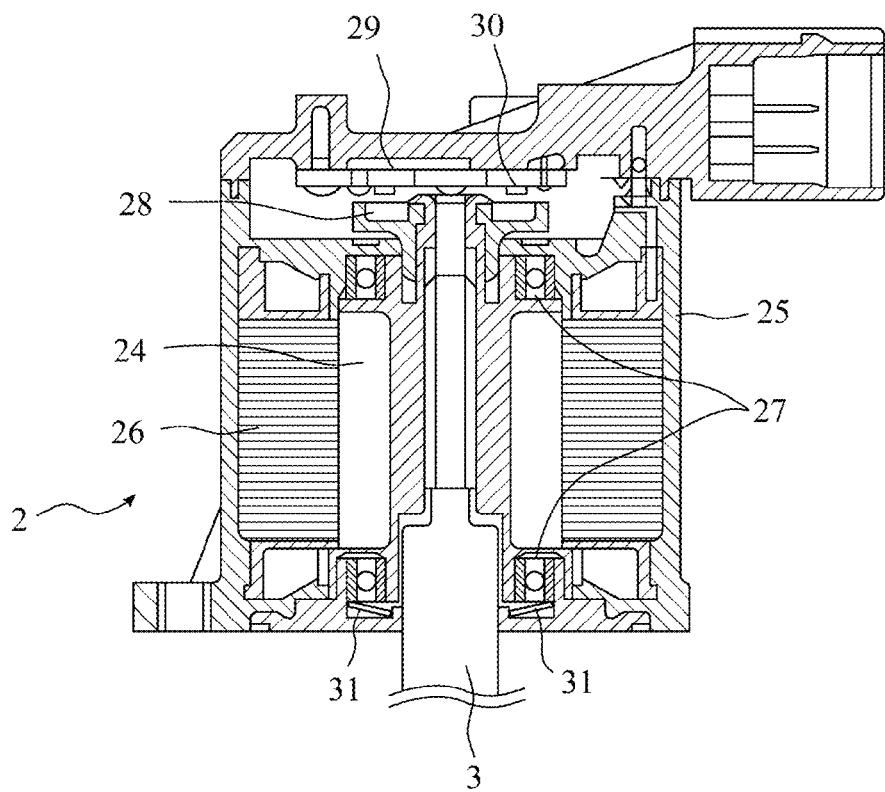
FIG. 5 is a cross-sectional view, taken along an axial direction, of a DC motor for deriving the EGR valve in accordance with Embodiment 1.

(3) Control of the Drive Duty Ratio According to a Bearing Supporting Mechanism and the Set Load of a Supporting Member FIG. 5 is a cross-sectional view, taken along an axial direction, of the DC motor 2 for deriving the EGR valve 1 in accordance with Embodiment 1. The DC motor 2 shown in FIG. 5 is a brush-less motor, and a cylindrical rotor Assy (a rotor) 24 screwed onto the shaft 3 is inserted into a hollow portion of a stator 26 adhered to a case 25 and is rotatably supported by bearings 27. Furthermore, a magnet 28 for magnetic pole position detection (the open position sensor) is adhered to the rotor Assy 24 in such a way that the magnet has a surface perpendicular to the axis of the rotor Assy.

Hole ICs (the open position sensor) 30 are mounted on a printed circuit board (the open position sensor) 29. Each of the hole ICs 30 is comprised of an integrated circuit (IC) into which Hall elements are incorporated. Furthermore, the printed circuit board 29 is attached to the case 25 in such a way that the hole ICs 30 are positioned opposite to the magnet 28 for magnetic pole position detection. The shaft 3 screwed into the rotor Assy 24 can be moved in axial directions (in upward and downward directions shown in FIG. 5) by the rotation of the rotor Assy 24.

The positions of the bearings 27 for the rotor Assy 2 are supported by a waved washer (a flat spring or a supporting member) 31. As mentioned above, because the EGR valve 1 has the shaft 3 which is the motor shaft and the valve shaft integrally formed with each other along the axial direction, the EGR valve has a large force of retracting the rotor Assy 24 toward the housing at the time when the EGR valve gets closed. Therefore, there is a possibility that the waved washer 31 supporting the bearings 27 for the rotor Assy 24 gets fatigued and damaged when a large load is imposed upon the waved washer 31 and the opening or closing operation of opening or closing the valve is repeated.

Therefore, the valve control apparatus 16, in accordance with present Embodiment 1 controls the drive duty ratio in such a way that the drive duty ratio does not exceed a predetermined value, thereby preventing a load exceeding the set load of the supporting member supporting the bearings 27 from being applied to the waved washer. For example, an upper limit of the drive duty ratio corresponding to the set load of the supporting member is set to the duty limiting unit 21, and the duty limiting unit 21 outputs the drive duty ratio inputted thereto from the PID circuit 20 to the driver 22 only when the inputted drive duty ratio has a value falling within a range which does not exceed the upper limit. By thus limiting the drive duty ratio, the valve control apparatus can prevent breakage from occurring in the supporting member.

In the case in which the supporting member supporting the bearings 27 for the rotor Assy 24 is the waved washer 31, as shown in FIG. 5, the valve control apparatus controls the drive duty ratio in such a way that the drive duty ratio does not exceed the upper limit of the drive duty ratio corresponding to the set load of the waved washer 31.

As mentioned above, the valve control apparatus in accordance with this Embodiment 1 sets a certain soft landing start target position to the drive control unit for carrying out feedback control of the driving of the DC motor 2 as a target open position in response to the fully close command, and sets the target open position which the valve control apparatus acquires by gradually decreasing the soft landing start target position to the above-mentioned drive control unit at the time when the difference between the actual open position determined from the linear movement of the shaft 3 and the soft landing start target position becomes equal to the first threshold. By doing in this way, the valve control apparatus can reduce shock when the valve element 8 is seated onto the valve seat in the EGR valve 1 having the shaft 3 in which the motor shaft and the valve shaft are integrally formed with each other along the axial direction.

INDUSTRIAL APPLICABILITY

As mentioned above, in order to reduce shock occurring in the valve apparatus at the time when the valve element is seated onto the valve seat, and carry out drive controlling in such away that the drive duty ratio of the motor becomes equal to or smaller than a predetermined load, the valve control apparatus in accordance with the present invention is configured in such a way as to include the fully closed state determining unit for setting a certain soft landing start target position to the drive control unit as the target open position in response to the fully close command, and for setting the target open position which the fully closed state determining unit acquires by gradually decreasing the soft landing start target position to the drive control unit at the time when the difference between the actual open position determined from the linear movement of the integrally constructed shaft and the soft landing start target position becomes equal to the first threshold. Therefore, the valve control apparatus in accordance with the present invention is suitable for use as a valve control apparatus that controls the opening of a valve, such as an EGR valve of a vehicle, or the like.

The invention claimed is:

1. A valve control apparatus for carrying out opening and closing control of a valve apparatus provided with an actuator and an integrally constructed shaft in which a driving shaft linearly moved by this actuator and a valve shaft are integrally formed with each other along an axial direction, for opening and closing a valve element with respect to a valve seat disposed in a valve housing according to a linear movement of the integrally constructed shaft in axial directions which is caused by a driving force of said actuator, said valve control apparatus comprising:
a drive control unit for carrying out feedback control of an open position of said valve apparatus in such a way that an actual open position determined from the linear movement of said integrally constructed shaft of said valve apparatus gets close to a target open position; and
a fully closed state determining unit for setting a certain soft landing start target position to said drive control unit as the target open position in response to a fully close command, and for setting the target open position which the fully closed state determining unit acquires by gradually decreasing said soft landing start target position to said drive control unit at a time when a difference between said actual open position and said soft landing start target position becomes equal to a first threshold, wherein
said soft landing start target position is a position which is apart from an immediately preceding fully closed position learned value by at least a detection error range of the open position at a time of learning of a fully closed position.

2. The valve control apparatus according to claim 1, wherein the first threshold is a value equal to or larger than a difference between the actual open position and the target open position which is expected from a temperature drift of an open position sensor for detecting the open position of the valve apparatus.

3. The valve control apparatus according to claim 1, wherein the fully closed state determining unit commands said drive control unit to block current conduction to said actuator when a time interval during which a drive duty ratio exceeds a second threshold goes beyond an end of a first wait time interval at a fully closed position.

4. The valve control apparatus according to claim 3, wherein the fully closed state determining unit does not provide the current conduction block command for the drive control unit at a time of learning of the fully closed position even if the time interval during which said drive duty ratio exceeds the second threshold goes beyond the end of the first wait time interval.

5. The valve control apparatus according to claim 3, wherein the second threshold is a value equal to or larger than the drive duty ratio which can permit generation of heat in the actuator due to a rise of said drive duty ratio.

6. The valve control apparatus according to claim 3, wherein the first wait time interval is equal to or longer than a lower limit of a time interval during which the valve apparatus gets closed without leakage, and is shorter than an upper limit of a time interval during which the actuator becomes damaged due to generation of heat therein due to a rise of the drive duty ratio.

7. The valve control apparatus according to claim 6, wherein said valve control apparatus has a temperature sensor for detecting a temperature of the actuator, and the upper limit is a time interval which elapses until the temperature detected by said temperature sensor reaches a temperature at which said actuator becomes damaged.

8. The valve control apparatus according to claim 6, wherein the upper limit is a time interval which elapses until a temperature predicted by a prediction model for defining a predetermined tendency of a temperature change in the actuator working reaches a temperature at which said actuator becomes damaged.

9. The valve control apparatus according to claim 3, wherein the actuator is a motor in which a rotor is connected to the driving shaft, and said valve control apparatus includes a duty limiting unit for limiting the drive duty ratio in such a way as to prevent a load enough to make a supporting member for supporting a bearing of said rotor become damaged in pulse width modulation control of said motor by the drive control unit from being applied to the supporting member.

10. The valve control apparatus according to claim 9, wherein the supporting member is a waved washer supporting the bearing of the rotor, and the duty limiting unit limits the drive duty ratio in such a way that a load imposed on the waved washer does not exceed a set load of said waved washer.

11. A valve apparatus comprising:
an actuator;
an integrally constructed shaft in which a driving shaft linearly moved by said actuator and a valve shaft are integrally formed with each other along an axial direction, for opening and closing a valve element with respect to a valve seat disposed in a valve housing according to a linear movement of the integrally constructed shaft in axial directions which is caused by a driving force of said actuator; and
a valve control apparatus according to claim 1, for controlling an open position of said valve apparatus by carrying out drive controlling of said actuator.

\* \* \* \* \*